United States Patent
Fisher et al.

(10) Patent No.: US 6,657,338 B2
(45) Date of Patent: Dec. 2, 2003

(54) TWO COMPARTMENT MOTOR

(75) Inventors: L. Edwin Fisher, Fort Wayne, IN (US); Mike A. Marks, Fort Wayne, IN (US); Carlos G. Estrada, Fort Wayne, IN (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/997,684

(22) Filed: Nov. 29, 2001

(65) Prior Publication Data

US 2003/0098621 A1 May 29, 2003

(51) Int. Cl.[7] .................................................. H02K 5/00
(52) U.S. Cl. .......................... 310/89; 310/71; 310/68 R
(58) Field of Search ............................... 310/89, 43, 58, 310/68 R, 71, 68 E, 68 A, 85, 112, 52

(56) References Cited

U.S. PATENT DOCUMENTS

| | | | |
|---|---|---|---|
| 4,513,214 A | * | 4/1985 | Dieringer ...................... 310/71 |
| 4,593,163 A | * | 6/1986 | Fisher ....................... 200/80 R |
| 4,668,898 A | * | 5/1987 | Harms et al. ................ 310/254 |
| 5,006,743 A | | 4/1991 | King et al. |
| 5,006,744 A | * | 4/1991 | Archer et al. ............. 310/68 R |
| 5,079,464 A | | 1/1992 | King et al. |
| 5,127,148 A | | 7/1992 | Lykes et al. |
| 5,220,226 A | | 6/1993 | Long et al. |
| 5,245,237 A | | 9/1993 | Fisher et al. |
| 5,430,931 A | | 7/1995 | Fisher et al. |
| 6,133,658 A | | 10/2000 | Fisher et al. |

* cited by examiner

Primary Examiner—Thanh Lam
(74) Attorney, Agent, or Firm—Karl A. Vick, Esq.; Armstrong Teasdale LLP

(57) ABSTRACT

A motor including a first compartment, a second compartment, a frame, a first end shield, a second end shield, an armature shaft, a stator winding, an armature, a cover, and a switchboard is provided. The first and second end shields are disposed adjacent opposing ends of the frame to define the first compartment. The armature shaft extends between the first and second end shields. The stator winding is supported by the frame within the first compartment. The armature is rotatably supported by the end shields and disposed within the first compartment adjacent the stator winding. The cover includes a first end, a peripheral edge, and ventilation openings. The cover peripheral edge is mounted to the motor adjacent the second end shield. The ventilation openings include a plurality of openings positioned along at least part of the cover peripheral edge and in the cover first end. The switchboard is mounted to the second end shield to define the second compartment between the switchboard and the second end shield. The switchboard includes a mounting means for securing a plurality of electrical components.

29 Claims, 6 Drawing Sheets

TWO COMPARTMENT MOTOR

BACKGROUND OF THE INVENTION

This invention relates generally to electric motors and, more particularly, to a two compartment electric motor.

Electric motors such as, for example, single phase induction motors, are manufactured in a variety of configurations for use in a number of different applications. For example, swimming pools and whirlpool spas typically use a number of electric motors for various purposes such as, for example, driving a water pump for water circulation purposes. Moisture, dust, and other contaminants, which may be prevalent in the environments associated with these types of applications, may adversely interfere with the operation of the motor and, over time, may lead to failure of the motor. To provide protection against the adverse effects posed by these contaminants, various techniques and motor designs have been utilized.

One approach to facilitate minimizing adverse effects from contaminants is to utilize a two-compartment motor. In a two-compartment motor, the stator, armature, and other primary motor components are contained in a first compartment and the secondary electrical components are contained in a second compartment. For example, U.S. Pat. No. 4,593,163 discloses a two compartment motor in which a starting capacitor, a thermal protector, a terminal board, a starting switch assembly, and a manually actuable switch are mounted to an end shield of an induction motor. A thermoplastic molded cover is secured to the motor with axially directed screws to define the second compartment of the motor.

U.S. Pat. No. 5,245,237 discloses another two-compartment motor in which a control assembly is mounted within a second compartment of a two-compartment motor. The control assembly includes a control plate, a plurality of electrical components, and mounting means for securing the electrical components in position on the control plate. To switch the voltage setting of the motor between high and low settings, a voltage selection switch is mounted on the control plate within the secondary compartment.

Constructing a two-compartment electric motor may be more costly than constructing other types of electric motors. For example, the costs of manufacturing a two-compartment motor are higher than the cost associated with manufacturing a one-compartment motor because of, for example, the inherent material costs associated with the second compartment. Second, in at least some known two-compartment motors, minimizing exposure to moisture, dust, and other contaminants is difficult because the components must be ventilated.

BRIEF DESCRIPTION OF THE INVENTION

In one aspect, a motor including a first compartment, a second compartment, a frame, a first end shield, a second end shield, an armature shaft, a stator winding, an armature, a cover, and a switchboard is provided. The first and second end shields are disposed adjacent opposing ends of the frame to define the first compartment. The armature shaft extends between the first and second end shields. The stator winding is supported by the frame within the first compartment. The armature is rotatably supported by the end shields and disposed within the first compartment adjacent the stator winding. The cover includes a first end, a peripheral edge, and ventilation openings. The cover peripheral edge is mounted to the motor adjacent the second end shield. The ventilation openings include a plurality of openings positioned along at least part of the cover peripheral edge and in the cover first end. The switchboard is mounted to the second end shield to define the second compartment between the switchboard and the second end shield. The switchboard includes a mounting means for securing a plurality of electrical components.

In another aspect, a two compartment motor including a frame, a first end shield, a second end shield, a stator winding, an armature, a cover, and a switchboard is provided. The first end shield and the second end shield are disposed adjacent opposing ends of the frame to define a first compartment. The stator winding is supported by the frame within the first compartment. The armature is rotatably supported by the end shields within the first compartment. The cover includes a plurality of cooling openings. The cover is mounted to the motor adjacent the second end shield. The switchboard is mounted to the second end shield to define the second compartment between the switchboard and the second end shield. The switchboard includes a mounting means for securing a plurality of electrical components within the second compartment.

In another aspect, a motor including a first compartment, a second compartment, a cover, and a switchboard assembly is provided. The first compartment is defined between a first end shield and a second end shield. The cover having ventilation openings is mounted adjacent the second end shield. The switchboard assembly is mounted to the second end shield to define the second compartment.

DETAILED DESCRIPTION OF THE INVENTION

Figure 1:
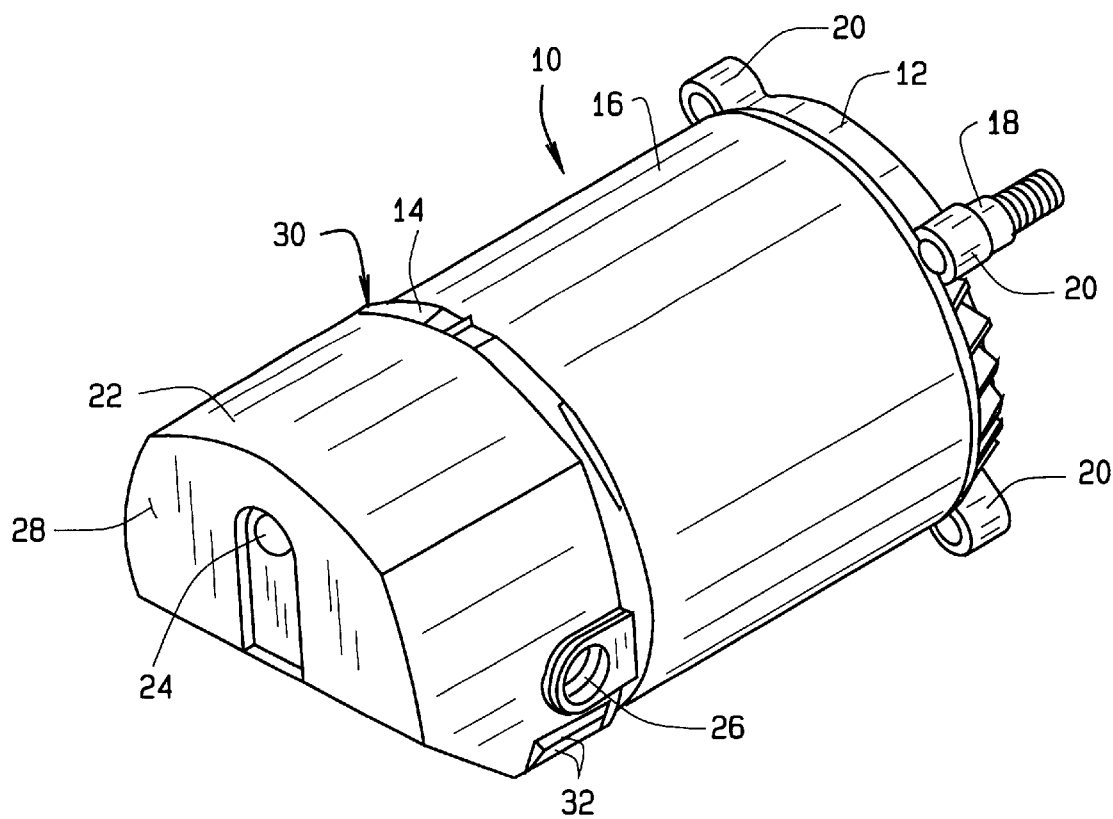
FIG. 1 is a perspective view of a two compartment motor.

FIG. 1 shows a perspective view of a two compartment motor 10 constructed in accordance with the present invention. Motor 10 has a first compartment which is defined by a first end shield 12, a second end shield 14 and a generally cylindrical frame 16. Frame 16 provides support for stator windings (not shown in FIG. 1), while end shields 12 and 14 are fitted with bearings to rotatably support an armature assembly within the first compartment adjacent the stator winding, as is well-known in the art. Armature shaft 18 extends from one end of motor 10 and is threaded, keyed or otherwise adapted for coupling to a load. End shield 12 is provided with a plurality of mounting lugs 20 which are used to securely mount motor 10 in operating position adjacent the load.

Motor 10 includes a second compartment (which may be referred to as the control compartment) which is generally defined by end shield 14 and a switchboard 21. As discussed in more detail below, the control compartment is used to house a plurality of electrical components used in the control and operation of motor 10. A cover 22 is secured to motor 10 by threaded, hex-head screw 24 and encases switchboard 21. Electrical access to the control compartment is provided by a conduit receiving opening 26 which is integrally formed in end shield 14.

Figure 2:
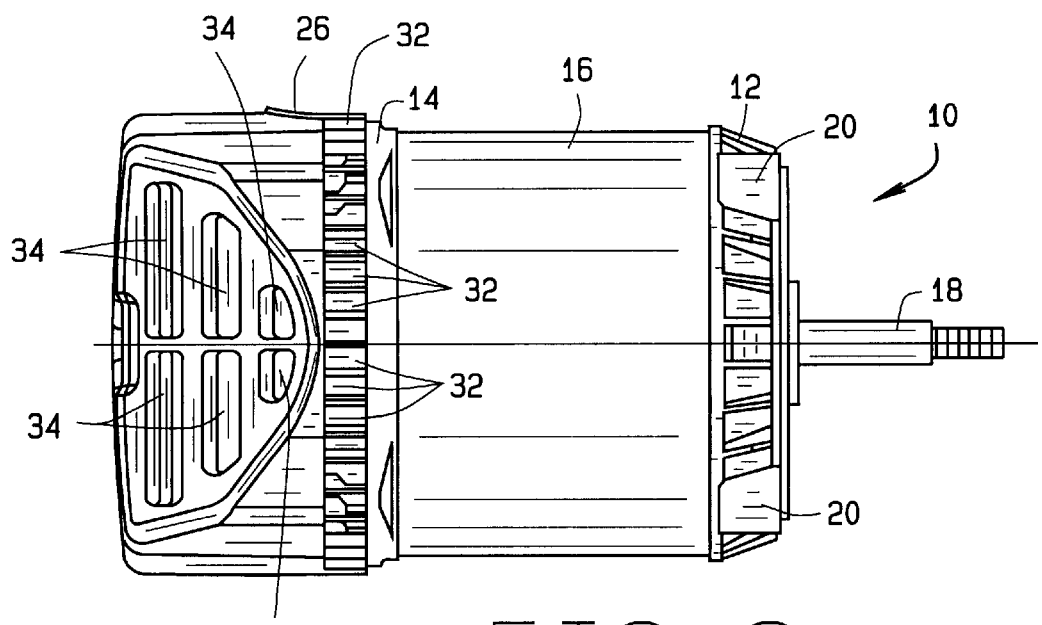
FIG. 2 is a bottom view of the two compartment motor shown in FIG. 1.

Cover 22 is a one-piece, cup-shaped element having a first end 28, a peripheral edge 30 that is mounted to the motor adjacent second end shield 14, and a plurality of ventilation openings which are shown in greater detail in FIG. 2.

FIG. 2 is a bottom view of motor 10 in which a plurality of ventilation openings 32 and 34 are visible. Openings 32 and 34 are integrally formed in cover 22 and are in flow communication with ventilation openings in end shield 14, which are described in greater detail hereinbelow. Ventilation openings 32 are relatively short, narrow openings integrally formed in cover 22 that extend along peripheral edge 30 of cover 20 from one lateral portion of the bottom of motor 10 to the opposing lateral portion of the bottom of motor 10, as shown in FIG. 1. Openings 32 extend longitudinally along motor 10 from peripheral edge 30 and are in flow communication with the ventilation openings in end shield 14 (shown in FIG. 3). Openings 34 are relatively long and wide openings integrally formed in cover 22 which are laterally centered in cover 10 on the bottom-side of motor 10. Openings 34 extend perpendicular to shaft 18. This arrangement, in combination with the ventilation openings in end shield 14, is intended to provide adequate ventilation and air discharge channels for motor 10, while reducing contamination of the two motor compartments with dust and moisture.

Figure 3:
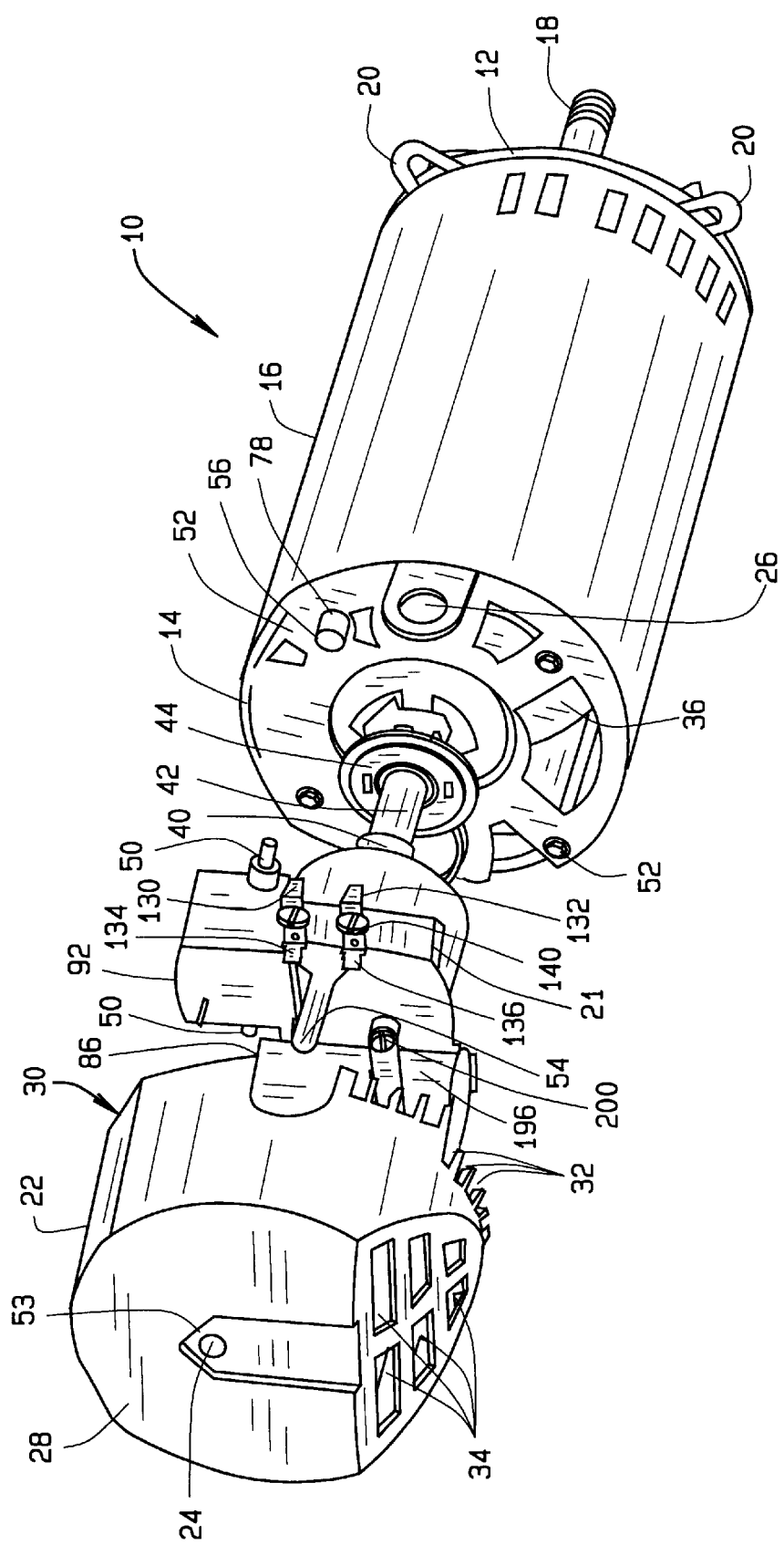
FIG. 3 is an exploded view of the two compartment motor shown in FIG. 1.

FIG. 3 shows an exploded view of motor 10 in which the major components are visible. The right-hand side of FIG. 3 shows the major components which define the first compartment of two compartment motor 10. These components include end shield 12, frame 16 and end shield 14. As noted above, stator windings 36 are supported by frame 16 within the first compartment. An armature 38 (not shown) is rotatably supported by end shields 12 and 14 adjacent stator windings 36. Armature shaft 18 extends from the first compartment through end plate 12 for connection to a load as previously discussed. On the other end of motor 10, shaft 18 extends through end shield 14 into the second compartment defined by switchboard 21 and end shield 14. This end of shaft 18 is provided with a slot 40 and wrench flats 42 to facilitate manual rotation of, or to secure against rotation of, armature 38 after the opposing end of shaft 18 is connected to a load. Shaft 18 is also provided with two circumferential grooves (not shown in FIG. 3) which accept two locking clips (not shown in FIG. 3) that secure centrifugal speed switch assembly 44 in position on shaft 18. A plurality of electrical conductors (not shown in FIG. 3), which are electrically connected to stator windings 36, extend from the first compartment through end plate 14 and electrically communicate with switchboard 21.

Defining the second compartment of motor 10 is switchboard 21 and end shield 14. In the embodiment illustrated, switchboard 21 is a one-piece molded plastic structure which provides a mounting base for securing a plurality of electrical components used in the control and operation of motor 10. The exact structure of the illustrated embodiment of switchboard 21 will be discussed in detail in connection with FIGS. 3, 6, and 7 below. Switchboard 21 is mounted to motor 10 by a pair of bolts 50 which extend through switchboard 21 and into end shield 14 to engage threads formed in end shield 14. Bolts 52 serve to secure end shields 12 and 14 to frame 16. In the assembly process, this arrangement allows switchboard 21 to be separately mounted to the sub-assembly which includes the first compartment of motor 10.

In the illustrated embodiment, cover 22 mounts, via screw 24 which extends through opening 53, to a threaded screw-receiving boss 54 which is an integrally formed element of switchboard 21. In an exemplary embodiment, screw 24 is "captured" in opening 53 so as to remain with cover 22 upon removal from motor 10. In this embodiment of the invention, both switchboard 21 and cover 22 are molded plastic components.

In an exemplary embodiment, a ground screw 56 which threads into an opening in boss 78 of end shield 14 to provide a convenient means by which to connect the metal components of motor 10 to a ground wire provided by the user.

Figure 4:
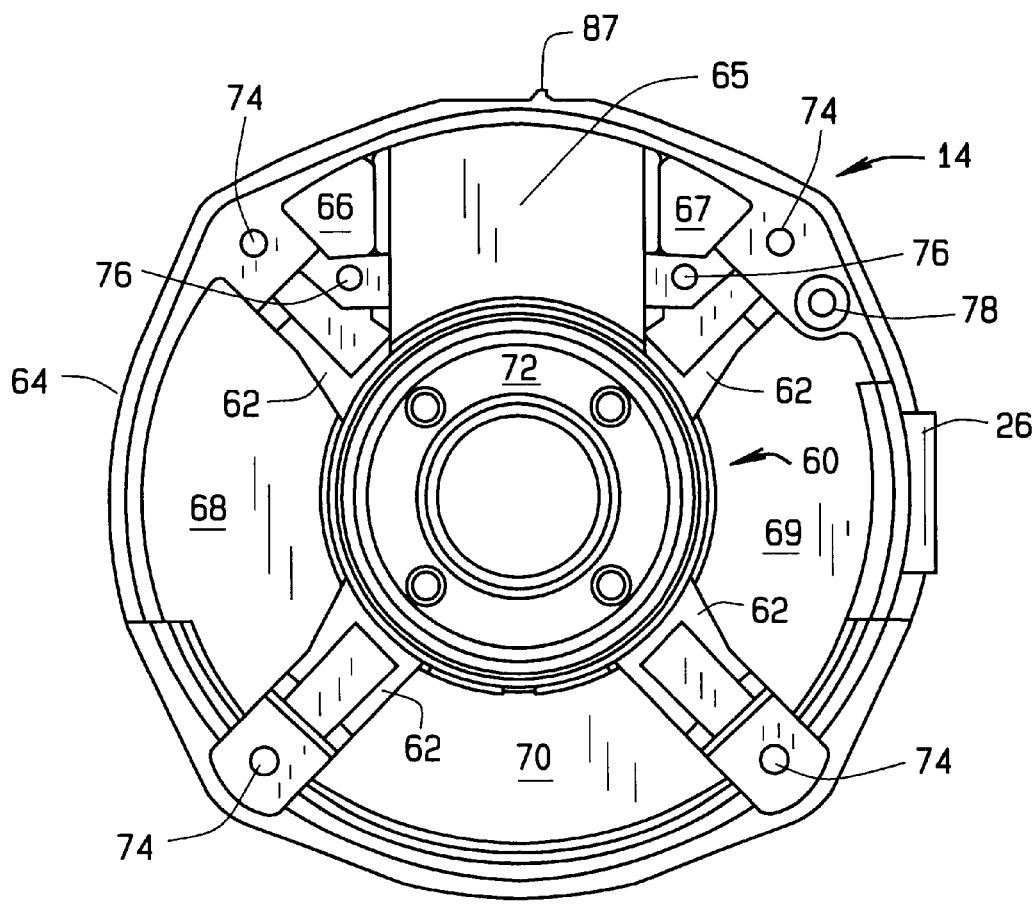
FIG. 4 is a plan view of an end shield that is part of the two compartment motor shown in FIG. 1.
Figure 5:
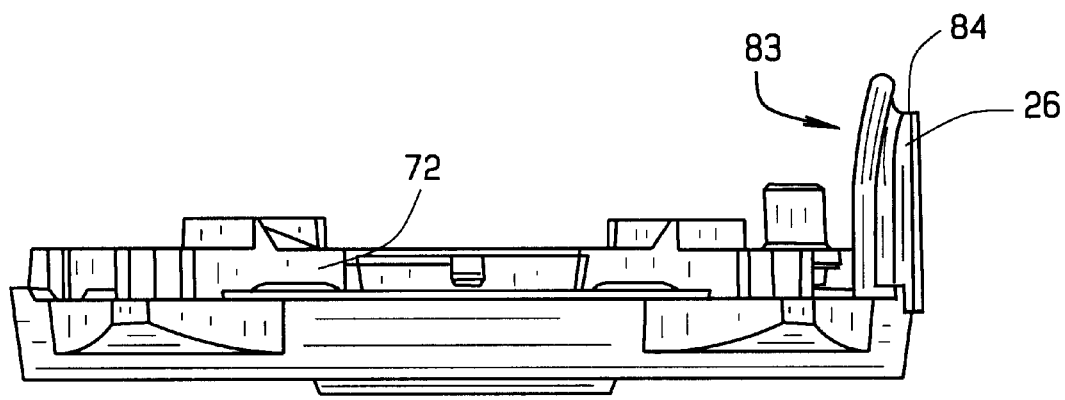
FIG. 5 is an elevational view the end shield shown in FIG. 4.

FIG. 4 is a plan view of end shield 14 of motor 10 and FIG. 5 is an elevational view of end shield 14. End shield 14 utilizes a "semi-skeleton" design which includes a central portion 60, four radially-extending spokes 62, a circumferential portion 64, and an upper portion 65 extending between central portion 60 and circumferential portion 64 at the top-side of motor 10. This arrangement provides relatively large openings 66–70 for the passage of ventilating air and power conductors through end shield 14. With reference to FIGS. 4 and 5, central portion 60 of end shield 14 includes a generally circular, annular recess 72 which faces away from armature 38 (not shown) when end plate 14 is assembled in motor 10. Recess 72 provides clearance for centrifugal switch assembly 44. Central portion 60 further includes, on the side of end shield 14 which faces the armature, a machined recess which is adapted to receive the bearing (not shown) which supports the respective end of armature 38.

End shield 14 is provided with four holes for receiving mounting bolts 50 and 52. Holes 74 receive bolts 52 to attach end shield 12 to frame 16 and end shield 14. Mounting holes 76 are formed to accept bolts 50 to mount switchboard 21 to end shield 14. An additional raised projection or boss 78 is provided as an additional locating and orientation landmark for switchboard 21, and provides a grounding point for connecting the metallic elements of motor 10 to a user supplied ground wire (shown in FIG. 3).

An additional feature of end shield 14 is integrally formed conduit receiving opening 26. Opening 26 is integrally formed in an upstanding portion 83 of end shield 14. Opening 26 is threaded to receive a conduit nipple to facilitate connection of the motor to an external power source. A recessed shoulder 84 is formed around three sides of opening 26 to mate with a similarly shaped cut-out 86 (shown in FIG. 1) in cover 22 to provide a step flange-type seal around the three sides of opening 26.

End shield 14 is also provided with a raised projection 87 on the outwardly facing side surface of circumferential portion 64. Projection 87 extends substantially parallel to the longitudinal axis of motor 10 across substantially the full width of circumferential portion 64 of end shield 14. The function of projection 87 is to provide an alignment and anti-rotation feature for a separately mounted "bonding lug" such as is commonly used in the swimming pool industry.

In the embodiment of the invention illustrated, end shields 12 and 14 are formed in one piece of a metallic material, such as cast aluminum.

As provided above, ventilation openings 32 (shown in FIG. 2) are integrally formed in cover 22 extending along peripheral edge 30 from one lateral portion of the bottom of motor 10 to the opposing lateral portion of the bottom of motor 10, and are in flow communication with the ventilation openings 66–70 in end shield 14. Vent openings 32, in combination with the open "semi-skeletal" construction of end shield 14 and large ventilation openings 34, ensure adequate ventilation of motor 10. These features further allow for simplified compliance with U.L. standards regarding molten metal protection. The integrally formed air channels in cover 22 improve the air intake and discharge capabilities of the motor, resulting in reduced motor operating temperature rises.

Figure 6:
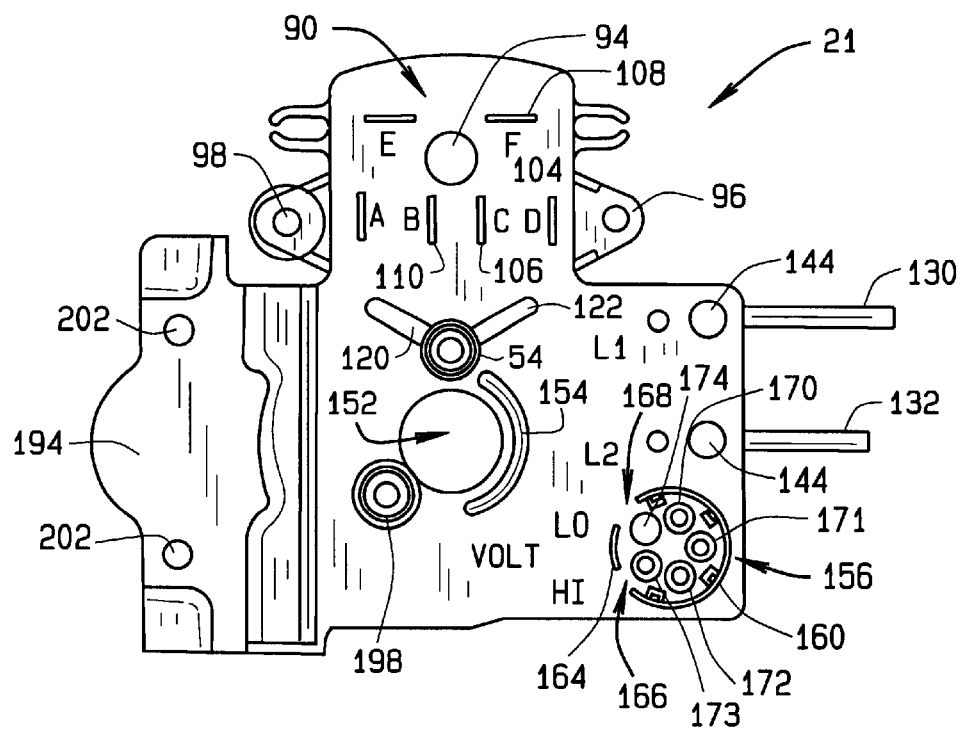
FIG. 6 is a plan view of the exterior side of a switchboard that is part of the two compartment motor shown in FIG. 1.

FIG. 6 is a plan view of the exterior side of switchboard 21 without a plurality of electrical components mounted thereon. The various features of switchboard 21 and the components will be described with reference to FIGS. 3 and 6, starting at the top or twelve o'clock position, as viewed in the figures, and moving clockwise around the switchboard. Near the top of switchboard 21 is an area 90 for mounting a portion of a centrifugal switch 92. Centrifugal switch 92 has an actuator portion which extends through an opening 94 formed in switchboard 21. Mounting holes 96 and 98 are also provided in switchboard 21 to receive screws 50 which secure centrifugal switch 92 in position and secure switchboard 21 to end shield 14.

The top surface 104 of centrifugal switch 92 is provided with a plurality of slots (e.g., 106, 108, and 110), some of which receive male terminals. In an exemplary embodiment, the male terminals are connected to female terminals which, in turn, are connected to electrical conductors (not shown).

Immediately below centrifugal switch 92 is integrally molded boss 54 which, as previously discussed in connection with FIG. 3, receives screw 24 to secure cover 22 in position. A pair of reinforcing gussets 120 and 122 are integrally molded to provide additional support for boss 54.

Leads 130 and 132 terminate in female terminals 134 and 136. Female terminals 134 and 136 mate with upwardly extending (i.e., out of the page) blade portions of S-shaped terminals 138 and 140, respectively. With reference to FIG. 3, three sets of mounting openings are provided for the S-shaped terminals. Each set includes a relatively small opening which is sized to receive a rivet, screw or other fastening device to mechanically secure the terminals to switchboard 21. Each set further includes a larger recess 144 to provide clearance for terminal screws, such as the screws shown in FIG. 3, which may be used to secure spade terminals or other conductors in electrical contact with the S-shaped terminals. S-shaped terminals 138 and 140 include a "lance" portion (not shown) to partially secure them to switchboard 21.

In the center of switchboard 21 is an opening 152 which provides clearance for armature shaft 18. Immediately adjacent opening 152 is an arcuate shield 154 which extends outwardly from switchboard 21 (i.e., out of the drawing in FIG. 6). Shield 154, in conjunction with a shield positioned within cover 22 (not shown), serves to shield terminals 134 and 136 and conductors 130 and 132 (shown in FIG. 3) from rotating armature shaft 18.

Adjacent lead 132 is a voltage selector switch 156 with a movable switch portion (not shown in FIG. 6). Switch 156 includes an outwardly extending arcuate portion 160 having inwardly and transversely extending lips near the top thereof to prevent or limit complete removal of the moveable switch portion from its position adjacent switchboard 21. A separate arcuate shaped portion 164 is formed between the opposing ends of arcuate portion 160 to provide two gaps 166 and 168. Within the circular area defined by arcuate portion 160 and 164 are a plurality of openings 170–174. At least some of these openings (i.e., 170–173) are fitted with electrical terminals (not shown). The female ends of each of the terminals receive one end of U-shaped conductors which are part of the movable switch portion (not shown). When the movable portion is engaged in the high position (shown in FIG. 6), the conductors connect a first set of terminals. When movable switch portion is engaged in the low position (shown in FIG. 6), different pairs of terminals are connected. The opposite ends of the terminals extend through switchboard 21 and are connected, such as by crimping, to electrical conductors (not shown).

Switch 156 is operated (i.e., moved from the high to low position or vice-versa}, by grasping an upstanding portion of the movable portion (not shown) and pulling the upstanding portion outwardly to disengage the conductors from the terminals until the edge portion of the moveable portion contacts the lips on arcuate portion 160. The movable portion is then rotated to the desired position and moved inwardly to engage the ends of the U-shaped conductors into the terminals. This arrangement provides an easy, convenient and inexpensive mechanism for selecting between high and low voltage settings. If desired, additional switch mechanisms of this type may be provided for, among other things, speed selection.

At approximately the nine o'clock position on switchboard 21 is a recess area 194 integrally formed with switchboard 21 to receive and hold starting capacitor 196 (shown in FIG. 3) in position. In an exemplary embodiment, a hole 198 is provided in switchboard 21 to accept a bolt 200 (shown in FIG. 3) to secure capacitor 196 to switchboard 21. A plurality of molded projections 202 serve as stand-offs to laterally position capacitor 196 on switchboard 21.

Figure 7:
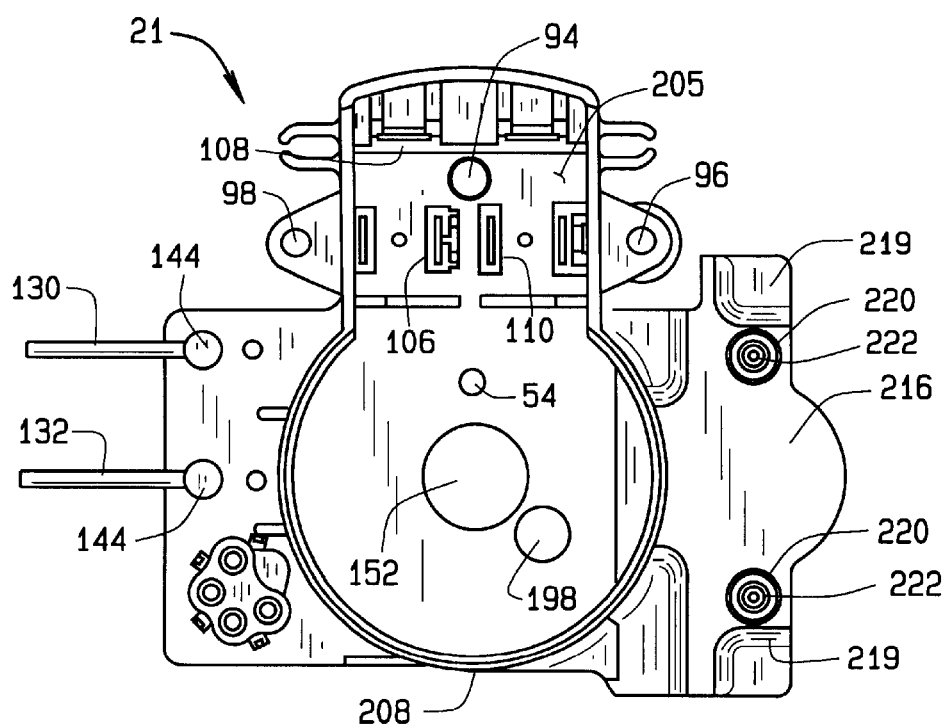
FIG. 7 is plan view of the interior or back side of the switchboard shown in FIG. 6.

FIG. 7 is plan view of the interior or back side of switchboard 21. The features of the back side of switchboard 21 will be discussed beginning at the top or twelve o'clock position and moving counterclockwise around the circumference of switchboard 21. To the extent features discussed in connection with FIG. 6 are shown unchanged in FIG. 7 (for example, mounting holes 96 and 98, etc.), such features are identified with like reference numbers in all figures, but are not separately discussed below.

A recess, generally indicated by reference numeral 205, is provided near the top of switchboard 21 to accommodate a multi-terminal electrical connector (not shown) which is configured to mate with an electrical connector (not shown) which, in turn, is connected to conductors (not shown) which extend into the first or motor compartment of motor 10. The multi-terminal electrical connector is connected to a plurality of electrical conductors which, in turn, are connected to various ones of the electrical components mounted on switchboard 21. The electrical connectors allow the electrical components on switchboard 21 to be conveniently and reliably connected to the other major components (e.g., stator windings 36) of motor 10 in a single operation to improve the quality and manufacturability of the motor.

Inwardly of recess 205 and opening 94 is a wall 208 which extends 360 degrees around an inner centrally located portion of switchboard 21 The inner surface of wall 208 defines a protected space for centrifugal speed switch assembly 44. Extending into this space is an actuator (not shown) which interacts with a rotating portion of switch 44 to open or close an electrical circuit, via centrifugal switch 92, when armature 36 (not shown) reaches a specified rotational speed.

Switch 156 was previously discussed in connection with FIG. 6 above. At approximately the three o'clock position, as viewed in FIG. 7, is a space 216 which is provided for mounting a thermal overload device (not shown) to switchboard 21. Projections 219 integral to switchboard 21 are provided along with a plurality of bosses 220 with openings 222 for receiving fasteners 224 (not shown) provided for mounting the thermal overload devise to switchboard 21. As with the other integrally formed features discussed above, projections 219 and bosses 220 are preferably molded of a plastic material to provide a one-piece, completely integrated structure.

Figure 8:
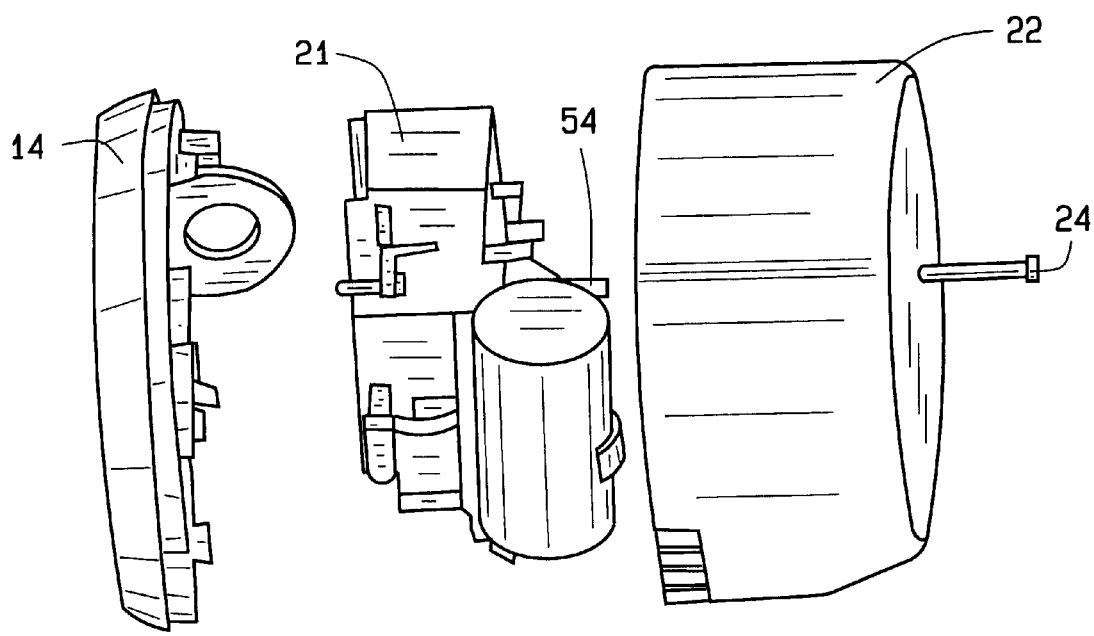
FIG. 8 is an exploded view of an end shield, a switchboard, and a cover that are part of the two compartment motor shown in FIG. 1.
Figure 9:
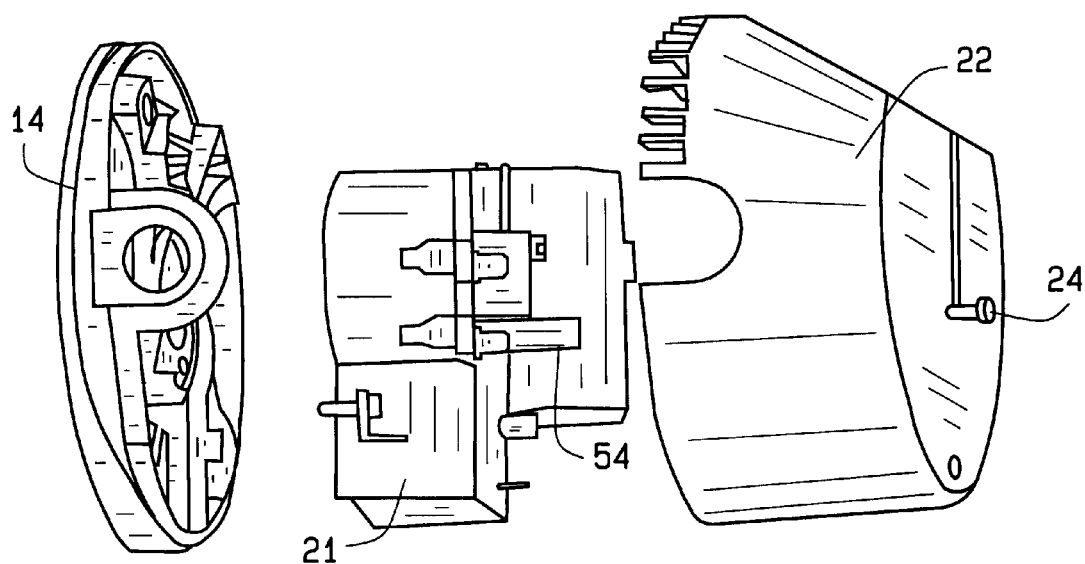
FIG. 9 is another exploded view of the end shield, the switchboard, and the cover shown in FIG. 8.
Figure 10:
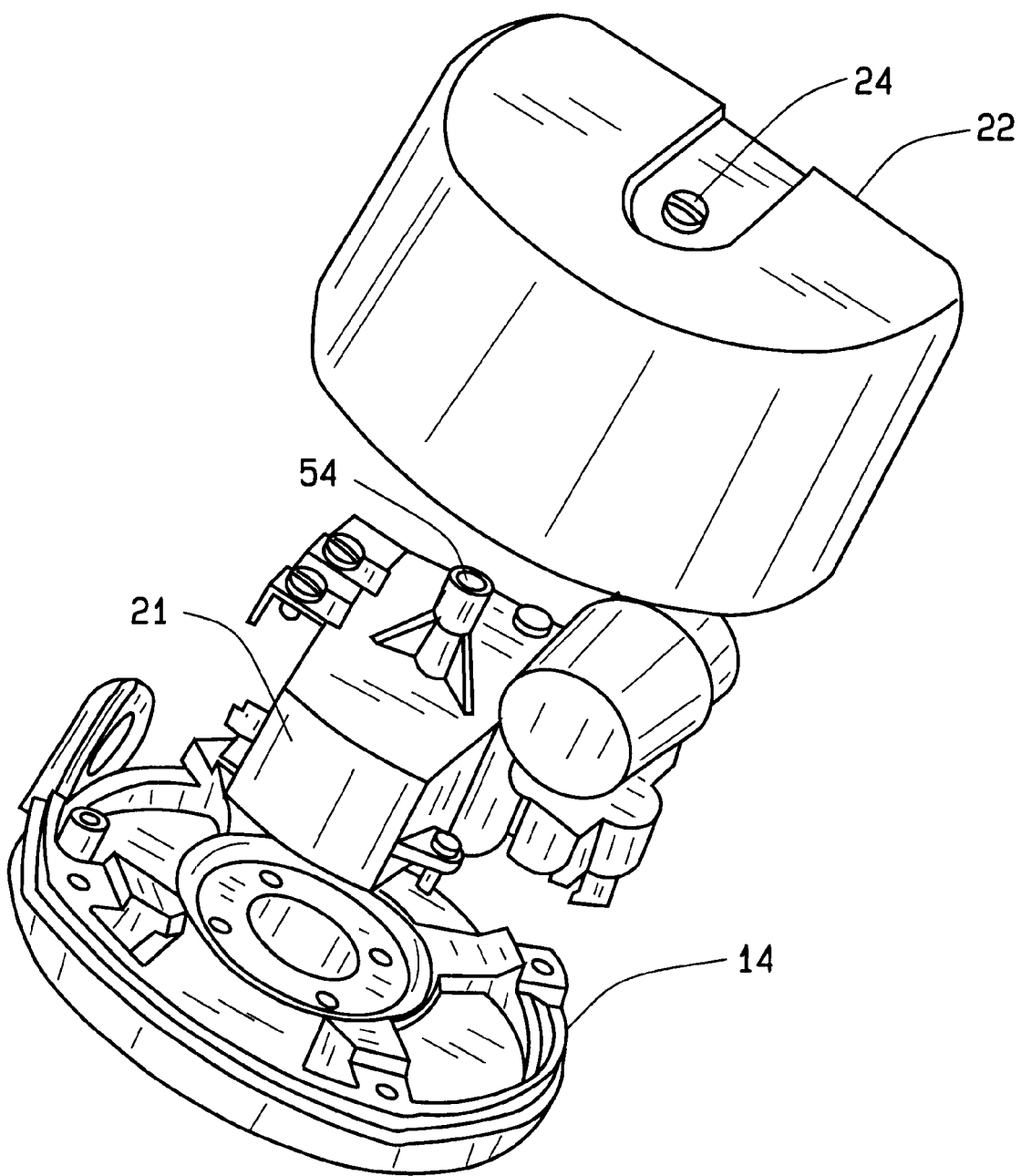
FIG. 10 is yet another exploded view of the end shield, the switchboard, and the cover shown in FIG. 8.

FIGS. 8, 9 and 10 are various exploded views of end shield 14, cover 22, and switchboard 21. Switchboard 21 and end shield 14 define the second compartment. As described above, in an exemplary embodiment, switchboard 21 is a one-piece molded plastic structure which provides a mounting base for securing a plurality of electrical components used in the control and operation of motor 10 (not shown in FIGS. 8, 9, and 10).

Switchboard 21 is mounted to motor 10 at end shield 14. In the assembly process of the exemplary embodiment, switchboard 21 can be separately mounted to the subassembly which includes the first compartment of motor 10. Cover 22 mounts, via screw 24, to a threaded screw-receiving boss 54 which is an integrally formed element of switchboard 21. In an exemplary embodiment, screw 24 is "captured" so as to remain with cover 22 upon removal from motor 10. In this embodiment of the invention, both switchboard 21 and cover 22 are molded plastic components. In this embodiment, end shields 14 is formed in one piece of a metallic material, such as cast aluminum.

In a two-compartment motor, the stator, armature, and other primary motor components are contained in a first compartment and the secondary electrical components are contained in a second compartment. The present invention provides a two compartment electric motor design which includes a switchboard to which a plurality of electrical components may be conveniently mounted. The present invention also provides a two compartment motor design in which a plurality of electrical control components may be premounted to a switchboard to form a subassembly prior to the assembly of the electrical component compartment of the motor. Furthermore, the present invention provides a two compartment motor that protects the electrical components from moisture, dust and other contaminants by enclosing the components within the switchboard. Also, the present invention provides a two compartment motor with improved ventilation features which may be integrally formed in the cover. Lastly, the present invention provides a more easily and reliably manufactured two compartment motor with fewer components, a reduced assembly time, and a reduced assembly cost.

While the invention has been described in terms of various specific embodiments, those skilled in the art will recognize that the invention can be practiced with modification within the spirit and scope of the claims.

What is claimed is:
1. A motor comprising:
 a first compartment;
 a second compartment;
 a frame;
 a first and a second end shield disposed adjacent opposing ends of said frame to define said first compartment;
 an armature shaft extending between said first and second end shields;
 a stator winding supported by said frame within said first compartment;
 an armature rotatably supported by said end shields and disposed within said first compartment adjacent said stator winding;
 a cover comprising a first end, a peripheral edge, and ventilation openings, said cover peripheral edge mounted to said motor adjacent said second end shield, said ventilation openings comprising a plurality of openings positioned along at least part of said cover peripheral edge and in said cover first end; and
 a switchboard mounted to said second end shield to define said second compartment between said switchboard and said second end shield, said switchboard comprising a mounting means for securing a plurality of electrical components.

2. A motor in accordance with claim 1 wherein said cover further comprises a plurality of ventilation openings positioned along at least a portion of said cover peripheral edge, said cover peripheral edge ventilation openings extending substantially parallel to said shaft toward said cover first end.

3. A motor in accordance with claim 2 wherein said second end shield comprises at least one opening in flow communication with said cover peripheral edge ventilation openings, said opening for channeling cooling air from said first compartment into said cover.

4. A motor in accordance with claim 3 wherein said cover further comprises a plurality of ventilation openings extending through said cover first end, said cover first end ventilation openings extending substantially perpendicular to said shaft, and in flow communication with said cover peripheral edge ventilation openings.

5. A motor in accordance with claim 1 wherein said cover peripheral edge contacts at least a portion of said switchboard and said second end shield.

6. A motor in accordance with claim 1 wherein said cover comprises a molded plastic element having a generally cup-shaped cross-section.

7. A motor in accordance with claim 6 wherein said cover further comprises a shield integrally molded with an interior surface of said cover, said cover shield configured to shield said armature shaft.

8. A two compartment motor comprising:
 a frame;
 a first and a second end shield disposed adjacent opposing ends of said frame to define a first compartment;
 a stator winding supported by said frame within said first compartment;
 an armature rotatably supported by said end shields within said first compartment;
 a cover comprising a plurality of cooling openings, said cover mounted to said motor adjacent said second end shield; and
 a switchboard mounted to said second end shield to define said second compartment between said switchboard and said second end shield, said switchboard comprising at least one electrical switch assembly, and a mounting means for securing a plurality of electrical components thereto.

9. A two compartment motor in accordance with claim 8 wherein said switchboard is molded, said switchboard mounting means integrally molded with said switchboard.

10. A two compartment motor in accordance with claim 8 wherein said second end shield further comprises at least one of an opening for providing access to an interior of said second compartment, said opening sized to receive at least one electrical conductor therethrough, a plurality of integrally formed cooling openings in flow communication with said cover ventilation openings for channeling cooling air toward and from said motor, and an integrally formed guard to facilitate reducing unintended contact between said armature and said plurality of electrical components within said second compartment.

11. A two compartment motor in accordance with claim 8 wherein at least one of said electrical components comprises a starting capacitor, said switchboard comprising an integrally molded recess area for securing said starting capacitor to said switchboard.

12. A two compartment motor in accordance with claim 8 wherein said plurality of electrical components comprises at least a speed selection switch, at least a portion of said speed selection switch integrally molded with said switchboard.

13. A two compartment motor in accordance with claim 8 wherein said plurality of electrical components comprises at least a voltage selection switch, at least a portion of said voltage selection switch integrally molded with said switchboard.

14. A two compartment motor in accordance with claim 8 wherein said plurality of electrical components comprises at least an overload device, said switchboard comprises an integrally formed means for mounting said overload device.

15. A two compartment motor in accordance with claim 8 wherein said switchboard comprises a recess for receiving electrical connectors to couple said stator winding to at least one electrical component mounted on said switchboard.

16. A two compartment motor in accordance with claim 8 further comprising first and second mating electrical connectors, said first connector electrically coupled to at least one electrical conductor coupled to said switchboard, said second connector electrically coupled to said stator winding, said switchboard comprises a recess adapted to receive said mated first and second connectors.

17. A two compartment motor in accordance with claim 8 wherein said armature comprises a shaft extending into said second compartment, said motor further comprising a centrifugal switch assembly comprising a rotatable portion coupled to said shaft.

18. A two compartment motor in accordance with claim 17 wherein said switchboard comprises an integrally molded recess portion for receiving and shielding at least a portion of said centrifugal switch assembly.

19. A two compartment motor in accordance with claim 18 wherein said centrifugal switch assembly further comprises an actuator portion, said switchboard further comprises an integrally formed mounting means for securing said actuator portion.

20. A two compartment motor in accordance with claim 8 wherein said second end shield comprises a central portion, a circumferential rim portion, a plate portion extending therebetween, and a plurality of spokes extending radially outwardly from said central portion.

21. A two compartment motor in accordance with claim 20 wherein said second end shield further comprises at least one opening between said central portion and said circumferential rim portion and between said spokes, said opening in flow communication with said cover cooling openings such that cooling air flows to and from said motor.

22. A motor comprising:
   a first compartment defined between a first end shield and a second end shield;
   a second compartment;
   a cover having ventilation openings mounted adjacent said second end shield; and
   a switchboard assembly comprising a switchboard mounted to said second end shield to define said second compartment, said switchboard configured to enclose a plurality of electrical components used for controlling and operating said motor.

23. A motor in accordance with claim 22 wherein said motor further comprises a frame extending between said first end shield and said second end shield defining said first compartment, and an armature shaft extending between said first and second end shields.

24. A motor in accordance with claim 23 wherein said motor further comprises a stator winding supported by said frame within said first compartment, and an armature rotatably supported by said end shields and disposed within said first compartment adjacent said stator winding.

25. A motor in accordance with claim 22 wherein said switchboard assembly comprises a plurality of electrical components for controlling said motor, and a mounting means for securing said electrical components in position on said switchboard.

26. A motor in accordance with claim 22 wherein said switchboard assembly comprises a switch having a movable portion and a stationary portion.

27. A motor in accordance with claim 26 wherein said switch stationary portion comprises at least one electrical terminal mounted in said switchboard and adapted for mating with a conductor in said movable portion.

28. A motor in accordance with claim 26 wherein said switch has an engaged position wherein said movable portion is electrically engaged with said stationary portion, and a disengaged position wherein said movable portion is rotatable relative to said stationary portion.

29. A motor in accordance with claim 26 wherein said switch has a first and second engaged positions wherein said movable portion is electrically engaged with said stationary portion, and a disengaged position wherein said movable portion is selectively movable between said first and second engaged positions.

* * * * *